United States Patent [19]

Nirasawa

[11] 3,735,397
[45] May 22, 1973

[54] A SPEED HEATING AND/OR TIME SIGNAL GENERATING SYSTEM FOR A SHIP

[76] Inventor: Tomiji Nirasawa, No. 660-2, Miyazawa-cho, Totsuka-ku, Yokohama, Japan

[22] Filed: July 13, 1970

[21] Appl. No.: 54,313

[30] Foreign Application Priority Data

July 15, 1969 Japan .....................44/55574

[52] U.S. Cl............................343/5 ST, 343/112 CA
[51] Int. Cl. ............................G01s 9/48, G01s 9/04
[58] Field of Search......................343/5 ST, 112 CA

[56] References Cited

UNITED STATES PATENTS 3,434,141  3/1969  Welti....................343/112 CA
2,688,130  8/1954  Whitaker et al..........343/5 ST

*Primary Examiner*—Benjamin A. Borchelt
*Assistant Examiner*—Gregory E. Montone
*Attorney*—Hill, Sherman, Meroni, Gross & Simpson

[57] ABSTRACT

A speed, heading and time signal generating system for a ship comprising means for producing a speed signal for controlling the speed of the ship, means for producing a heading signal for controlling the heading of the ship, such that when the ship is in danger of a collision with other objects, a collison is avoided This is accomplished by setting into the system a signal representative of the distance of the closest point of approach between the ship and the other object as well as speed and bearing signals. Additional signals representative of the relative distance between the ship and the other object and representative of the relative head bearing between the ship and the other object, and also a signal representative of the relative distance between the ship and the other object at a predetermined past time are utilized. The system further comprises means for producing a time signal representative of the time at which the distance of the closest point of approach between the ship and the other object would occur.

16 Claims, 4 Drawing Figures

A SPEED HEATING AND/OR TIME SIGNAL GENERATING SYSTEM FOR A SHIP

BACKGROUND OF THE INVENTION

1. Field of the Invention

This invention relates to a speed, heading and/or time signal generating system for a ship which prevents collisions with other objects, for example, such as a neighboring ship, land or the like, and more particularly to a speed, heading and/or time signal generating system for a ship which is adapted to produce a signal or signals for controlling the speed and/or heading of the ship for avoidance of a collision with other objects. The system also calculates signal representative of the time at which the distance of the closest point of approach would occur between the ship and the other object by utilizing the speed and/or heading signals.

2. Description of the Prior Art

With the radar display system, the relative motion of a target such, for example, as a neighboring ship, land or other object to a ship is indicated by a relative motion-true bearing display on the display screen of a cathode ray tube of a radar apparatus mounted on the ship. This enables monitoring of the possibility of a collision of the ship with the target or other object on the display screen. In the event that the possibility of a collision is noted, the speed and/or heading of the ship must be immediately changed. For this it is necessary to produce a signal or signals for controlling the speed and/or heading of the ship early enough to avoid the collision. It is desirable to calculate a signal of the time in which the distance of the closest point of approach will occur between the ship and other object after the speed and/or heading of the ship has been changed. In order to assure safe navigation, when the ship is in danger of a collision with another object, it is necessary to produce the speed, heading and/or time signal to assure avoidance of a collision.

However, automatic systems for providing and utilizing such signal or signals have not been previously developed.

In prior art devices when the possibility of collisions occur, the speed and heading of the ship have been changed for a short time and then the distance of the closest point of approach between the ship and the other object is measured in advance and also the time at which the distance of the closest point of approach is reached is measured.

SUMMARY OF THE INVENTION

The primary object of this invention is to provide a novel anti-collision system for a ship which automatically controls the speed and/or heading to avoid collision. The system may also calculate the time at which the ship would arrive at the nearest point to the object after the speed and/or heading has been changed.

According to this invention, when there is the possibility of a collision of a ship, it is possible to obtain signals for controlling the speed and/or heading to avoid the collision and to also produce a signal proportional to the time at which the distance of the closest point of approach between the ship and object would occur after the speed and/or heading has been changed. A signal representative of the distance of the closest point of approach between the ship and the object is established such that such distance is large enough to assure avoidance of collision.

Other objects, features and advantages of this invention will become apparent from the following description taken in conjunction with the accompanying drawings.

DESCRIPTION OF THE PREFERRED EMBODIMENTS

Figure 1:
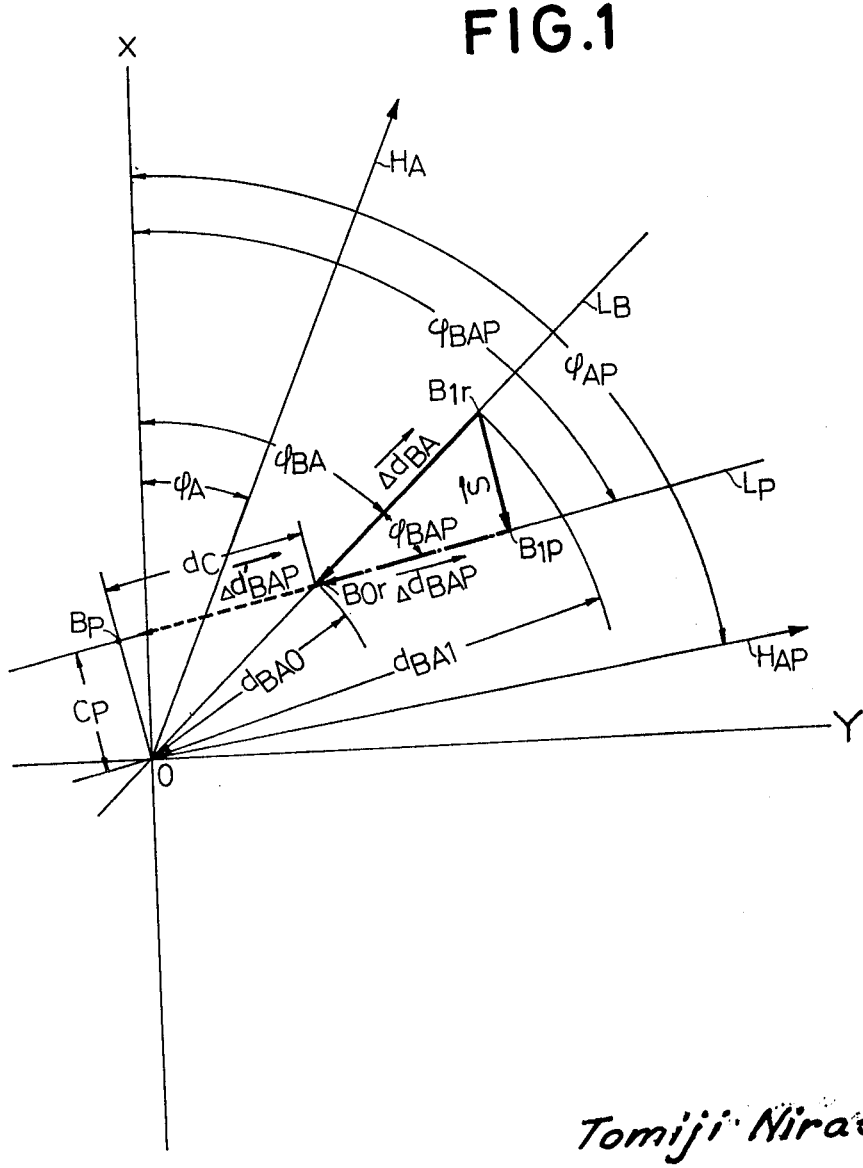
FIG. 1 is a diagrammatic showing of a relative motion-true bearing display for explaining this invention.

For a better understanding, a description of the principles of this invention will be given. The sailing conditions of a pair of ship A and a neighboring ship B can be monitored by a relative motion-true bearing display on the screen of a cathode ray tube of a radar apparatus on the ship A. With a relative motion-true bearing display, if the ships A and B have relative velocity and bearing such that a collision would occur between a present time $t_0$ and a time $t_1$ which is earlier than $t_0$ by a short time $\Delta t$, the locus of the ship B between the time $t_1$ and $t_0$ is indicated as shown in FIG. 1 on a plotting plate placed over the screen by a relative distance vector $\vec{\Delta d_{BA}}$ directed toward the origin $0$ on a line $L_B$ passing through the origin $0$ formed by X- and Y-axes. The origin represents the position of the ship A which is with the radar apparatus. If the speed vectors of the ships A and B during the time $t$ between the times $t_1$ and $t_0$ are respectively taken as $\vec{V_A}$ and $\vec{V_B}$ and if $\vec{V_A}\cdot\Delta t = \vec{\Delta d_A}$, $\vec{V_B}\cdot\Delta t = \vec{\Delta d_B}$ and $\vec{V_B} - \vec{V_A} = \vec{V_{BA}}$, the relative distance vector $\vec{\Delta d_{BA}}$ is given by the following equation.

$$\vec{\Delta d_{BA}} = \vec{\Delta d_B} - \vec{\Delta d_A}$$
$$= (\vec{V_B} - \vec{V_A})\Delta t$$
$$= \vec{V_{BA}}\cdot\Delta t \qquad (1)$$

In FIG. 1 reference characters $B_{0r}$ and $B_{1r}$ respectively indicate the positions of the neighboring ship B at the times $t_0$ and $t_1$ and $H_A$ the heading of the ship A between the times $t_1$ and $t_0$.

In the event that the ships A and B have had such a relation to each other as would lead to their collision between the times $t_1$ and $t_0$, the collision can be avoided by changing the relative speed vector $\vec{V_{BA}}$ of the ships A and B at the time $t_0$ and thereafter. However, the speed vector $\vec{V_B}$ of the neighboring ship B cannot be changed by the ship A but the collision can be avoided by changing the speed vector $\vec{V_A}$ of the ship A to $\vec{V_{AP}}$ at the time $t_0$ and thereafter assuming that the ship B would not alter her speed vector $\vec{V_B}$.

Assuming that a display can be provided for the future time after the time $t_0$, avoidance of the collision can be indicated in the form of a relative distance vector $\vec{\Delta d'_{BAP}}$ of the ships A and B on a line $L_P$ passing through the point $B_{0r}$ and a point spaced away from the origin $0$ by a distance $C_P$, as indicated by broken line in FIG. 1. If the speed vector of the ship A at a time $t_p$ which is later than the time $t_0$ by $\Delta t$ is taken as $\vec{V'_{AP}}$ and $\vec{V'_{AP}}\cdot\Delta t = \vec{\Delta d'_{AP}}$, and if the speed vector of the other ship B remains unchanged, at $V_B$ between the times $t_1$ and $t_0$, then $\vec{V_B}\cdot\Delta t = \vec{\Delta d_B}$, so that $\vec{V_B} - \vec{V_{AP}} = \vec{V'_{BAP}}$. Consequently, the relative distance vector $\vec{\Delta d'_{BAP}}$ is given by the following equation.

$$\overrightarrow{\Delta d'}_{BAP} = \overrightarrow{\Delta d}_B - \overrightarrow{\Delta d'}_{AP}$$
$$= (\overrightarrow{V}_B - \overrightarrow{V'}_{AP})\Delta t$$
$$= \overrightarrow{V'}_{BAP} \cdot \Delta t \qquad (2)$$

In practice however, the distance $C_P$ represents the distance of the closest point of approach between the ships A and B but the distance $C_P$ is obtained by selecting the value of $\overrightarrow{V'}_{AP}$ so as to obtain $\overrightarrow{\Delta d}_{BAP}$ for which the value of the distance $C_P$ exceeds that of a predetermined distance $C$ of the closest point of approach. In FIG. 1 reference character $H_{AP}$ indicates the heading line of the ship A between the times $t_0$ and $t_p$ in the above case, which is determined from upon $\overrightarrow{V'}_{AP}$ and $\overrightarrow{V}_B$ between the times $t_0$ and $t_p$.

In the event that the relative distance vector $\overrightarrow{\Delta d}_{BA}$ indicated by full line in FIG. 1 which represents the possibility of a collision of the ships A and B is obtained during the times $t_1$ and $t_0$, the collision can be avoided by selecting $\overrightarrow{V'}_{AP}$ of the ship A at the time $t_0$ and thereafter in such a manner as to obtain $\overrightarrow{\Delta d'}_{BAP}$ as indicated by the broken line between the times $t_0$ and $t_p$ which prevents collision between the ships A and B.

The present inventor has discovered that if the top end of the relative distance vector $\overrightarrow{\Delta d}_{BAP}$ of the ships A and B during the times $t_1$ and $t_0$ lies at the point $B_{0r}$ on the line $L_P$ as indicated by the chain line in FIG. 1, the collision of the ships A and B can also be avoided by obtaining the distance vector of the ship A based upon $\overrightarrow{\Delta d}_{BAP}$ after the present time $t_0$.

If $\overrightarrow{\Delta d}_{BAP}$, $\overrightarrow{\Delta d}_{BA}$ and the distance vector $\overrightarrow{S}$ joining the points $B_{1r}$ of $\overrightarrow{\Delta d}_{BA}$ and $B_{1p}$ of $\overrightarrow{\Delta d}_{BAP}$ at the time $t_1$ have the following relationship.

$$\overrightarrow{S} = \overrightarrow{\Delta d}_{BA} - \overrightarrow{\Delta d}_{BAP} \qquad (3)$$

and if the speed vector of the ship A is $\overrightarrow{V}_{AP}$, her distance vector $\overrightarrow{\Delta d}_{AP}$ is equal to $\overrightarrow{V}_{AP} \cdot \Delta t$. The speed and distance vectors of the neighboring ship B are respectively $\overrightarrow{V}_B$ and $\overrightarrow{\Delta d}_B$, and the relative distance vector $\overrightarrow{\Delta d}_{BAP}$ can be expressed as follows.

$$\overrightarrow{\Delta d}_{BAP} = \overrightarrow{\Delta d}_B - \overrightarrow{\Delta d}_{AP}$$
$$= (\overrightarrow{V}_B - \overrightarrow{V}_{AP})\Delta t$$
$$= \overrightarrow{V}_{BAP} \cdot \Delta t \qquad (4)$$

The equation (3) can be expressed by the following equation.

$$\overrightarrow{S} = (\overrightarrow{V}_{BA} - \overrightarrow{V}_{BAP}) \cdot t \qquad (5)$$

Rearranging equation (5), gives the following results.

$$\overrightarrow{S} = \{(\overrightarrow{V}_B - \overrightarrow{V}_A) - (\overrightarrow{V}_B - \overrightarrow{V}_{AP})\}\Delta t$$
$$= \{(\overrightarrow{V}_{AP} - \overrightarrow{V}_A) - (\overrightarrow{V}_B - \overrightarrow{V}_B)\}\Delta t$$
$$= (\overrightarrow{V}_{AP} - \overrightarrow{V}_A)\Delta t \qquad (6)$$

The following equation is obtained from equations (5) and (6).

$$\overrightarrow{V}_{AP} = (\overrightarrow{V}_{BA} - \overrightarrow{V}_{BAP}) + \overrightarrow{V}_A \qquad (7)$$

Rearranging equation (7), gives the following.

$$\overrightarrow{V'}_{AP} = \frac{1}{\Delta t}(\overrightarrow{\Delta d}_{BA} - \overrightarrow{\Delta d}_{BAP}) + \overrightarrow{V}_A \qquad (8)$$

Consequently, if $\Delta \overrightarrow{V}_{BAP}$ in equation (7) or $\Delta \overrightarrow{d}_{BAP}$ in equation (8) and $\Delta t$ are established, $\overrightarrow{V}_{AP}$ can be regarded as the speed vector of the ship A to be adopted at the time $t_0$ and thereafter.

In one example of the present invention when the ships A and B are on a collision course, which would lead to their collision, the speed vector signal (speed and heading signals) for controlling the speed and heading of ship A is changed in accordance with equations (7) and/or (8) at the present time and thereafter so as to avoid collision between the ships.

A description will be given of one example of this invention for producing in accordance with equations (7) and (8) signals for controlling the speed and heading of the ship A at present time and thereafter so as to avoid collision with the neighboring ship B.

A description will first be given for the system for producing the signal for controlling the speed of the ship A so as to avoid collision. The speed signal corresponds to the scalar of $\overrightarrow{V}_{AP}$ of the equations (7) and (8), so that if a voltage signal corresponding to the scalar of $\overrightarrow{V}_{AP}$ is taken as $E_{V.AP}$, the speed signal can be expressed as $E_{V.AP}$.

It will be seen that if voltage signals corresponding to the scalar of $\overrightarrow{V}_{BA}$, $\overrightarrow{V}_{BAP}$ and $\overrightarrow{V}_A$ in the equation (7) are respectively taken as $E_{V.BA}$, $E_{V.BAP}$ and $E_{V.A}$ and if the bearings of $\overrightarrow{V}_{AP}$ (indicated as the bearing of the line $H_{AP}$), $\overrightarrow{V}_{BA}$ (indicated as that of $\overrightarrow{d}_{BA}$), $\overrightarrow{V}_{BAP}$ (indicated as that of $\overrightarrow{\Delta d}_{BAP}$) and $\overrightarrow{V}_A$ (indicated as that of the line $H_A$) are respectively taken as $L\phi_{AP}$, $L\phi_{BA}$, $L\phi_{BAP}$ and $L\phi_A$, the following equation can be obtained from equation (7).

$$E_{V.AP}L\phi_{AP} = E_{V.BA}L\phi_{BA} - E_{V.BAP}L\phi_{BAP} + E_{V.A}L\phi_A \qquad (9)$$

Further, it will be apparent that if $E_{V.BA}L\phi_{BA}$ in equation (9) is resolved into its X- and Y-axis components in FIG. 1 and they are respectively taken as $(E_{V.BA})_x$ and $(E_{V.BA})_y$ and if the X- and Y-axis components of $E_{V.BAP}L\phi_{BAP}$ and $E_{V.A}L\phi_A$ are respectively taken as $(E_{V.BAP})_x$ and $(E_{V.BAP})_y$, and $(E_{V.A})_x$ and $(E_{V.A})_y$, the voltage signal $E_{V.AP}$ is given by equation (10) obtained from equation (9).

$$E_{V.AP} = \sqrt{\{(E_{V.BA})_x - (E_{V.BAP})_x + (E_{V.A})_x\}^2 + \{(E_{V.BA})_y - (E_{V.BAP})_y + (E_{V.A})_y\}^2} \qquad (10)$$

It will be understood that the following relationships exist.

$$\left. \begin{array}{l} (E_{V.BA})_x = E_{V.BA} \cdot \cos\phi_{BA} \\ (E_{V.BAP})_x = E_{V.BAP} \cdot \cos\phi_{BAP} \\ (E_{V.A})_x = E_{V.A} \cdot \cos\phi_A \end{array} \right\} \qquad (11)$$

$$\left. \begin{array}{l} (E_{V.BA})_y = E_{V.BA} \cdot \sin\phi_{BA} \\ (E_{V.BAP})_y = E_{V.BAP} \cdot \sin\phi_{BAP} \\ (E_{V.A})_y = E_{V.A} \cdot \sin\phi_A \end{array} \right\} \qquad (12)$$

If the distances from the origin 0 to the points $B_{0r}$ and $B_{1r}$ are respectively taken as $d_{BA0}$ and $d_{BA1}$ and if voltage signals corresponding to $d_{BA0}$ and $d_{BA1}$ are respectively taken as $E_{d.BA0}$ and $E_{d.BA1}$, $$|\overrightarrow{\Delta d_{BA}}| = d_{BA0} - d_{BA1}$$

and consequently the aforementioned voltage signal $E_{V.AB}$ is given by the following equation.

$$E_{V.AB} = \frac{E_{d.BA0} - E_{d.BA1}}{t} \quad (13)$$

where $\Delta t$ is a time but is regarded as a mere numerical value in this case.

Further, $E_{V.BAP}$ corresponds to the scalar of $\overrightarrow{V_{BAP}}$ or $\overrightarrow{\Delta d_{BAP}}$ which are established to be $\alpha$ times $E_{V.BA}$ ($\alpha$ being zero or a positive number). Accordingly, $E_{V.BA}$ is given by the following equation.

$$E_{V.BAP} = \alpha \cdot E_{V.BA} \quad (14)$$

In addition, if the angle between $\overrightarrow{\Delta d_{BA}}$ and $\overrightarrow{\Delta d_{BAP}}$ is taken as $\phi'_{BAP}$, the angle $\phi_{BAP}$ is expressed by the following equation, as will be apparent from FIG. 1.

$$\phi_{BAP} = \phi_{BA} + \phi'_{BAP} \quad (15)$$

As will be seen from the foregoing, the angle $\phi_{BAP}$ is the bearing of the line $L_P$ which indicates the relative bearing between the ships A and B for avoidance of collision and the line $L_P$ passes through the closest point of approach of the ships A and B defining the closest distance $C_P$ therebetween with the origin 0. Accordingly, if the distance $C_P$ is equal to a predetermined distance $C$ of the closest point of approach, the following equation can be obtained.

$$\sin \phi'_{BAP} = \frac{C}{d_{BA0}} \quad (16)$$

Therefore, by substitution into equation (15) the following equation is obtained.

$$\phi_{BAP} = \phi_{BA} + \sin^{-1} \frac{C}{d_{BA0}} \quad (17)$$

Consequently, if an electric signal corresponding to the distance $C$ is taken as $E_C$, the following equation can be obtained.

$$\phi_{BAP} = \phi_{BA} + \sin^{-1} \frac{E_C}{E_{d.BA0}} \quad (18)$$

It will be understood that when $E_{d.BA0}$, $E_{d.BA1}$, $\phi_{BA}$, $E_{V.A}$ and $\phi_A$ have once been obtained, the signal for controlling the speed of the ship A for avoidance of a collision with the ship B at the present time and thereafter can be obtained with $E_{V.AP}$ given by the equation (10) utilizing the equations (11) to (18) by establishing $\Delta t$, $\alpha$ and $E_C$. $E_{d.BA0}$ is readily obtained by a usual radar systems at the present time $t_0$, and $E_{d.BA1}$ may also be obtained by usual radar systems for the time $t_1$ and memorized or plotted in advance on the display screen of a radar apparatus capable of relative motion-true bearing display at the time $t_1$. The signals may then be read out at the time $t_0$. $\phi_{BA}$ is likewise obtained with the usual radar system at the time $t_0$ and $E_{V.A}$ and $\phi_A$ can also be easily obtained.

A description will be given of the heading of the ship A under conditions such that the speed signal $E_{V.AP}$ can be obtained. The heading of the ship A in this case is $\phi_{AP}$ and is given by the following equation, as will be apparent from the fact that the speed signal $E_{V.AP}$ is obtained from equation (10).

$$\phi_{AP} = \tan^{-1} \frac{(E_{V.BA})_y - (E_{V.BAP})_y + (E_{V.A})_y}{(E_{V.BA})_x - (E_{V.BAP})_x + (E_{V.A})_x} \quad (19)$$

It will be seen that the heading of the ship A in this case can be obtained as $\phi_{AP}$ given by the equation (19) from the equations (11) to (18).

The foregoing description has been made in connection with the speed signal $E_{V.AP}$ and the head bearing $\phi_{AP}$ of the ship A to be selected at the time $T_0$ and thereafter on the assumption that the ships A and B have such a relationship to each other such that a collision would occur between the times $t_1$ and $t_0$. The time $T$ from $t_0$ to a time when the distance $C$ of the closest point of approach is obtained between the ships A and B in the following manner. If the distance between the point $B_{0r}$ and $B_p$ where the ships A and B would be at the closest distance $C$ from each other is taken as $d_c$ as depicted in FIG. 1, the following equation is given, since $d_c = d_{BA0} \cos \phi'_{BAP}$.

$$T = \frac{d_{BA0} \cdot \cos \phi'_{BAP}}{|\overrightarrow{V_{BAP}}|} = \frac{d_{BA0} \cdot \cos \phi'_{BAP}}{|\overrightarrow{\Delta d_{BAP}}|/\Delta t} \quad (20)$$

The time $T$ is obtained from the above equation (20) as follows.

$$T = \frac{E_{d.BA0} \cdot \cos \phi'_{BAP}}{E_{V.BAP}} \quad (21)$$

Thus, the time $T$ can be obtained from equation (21).

Figure 2:
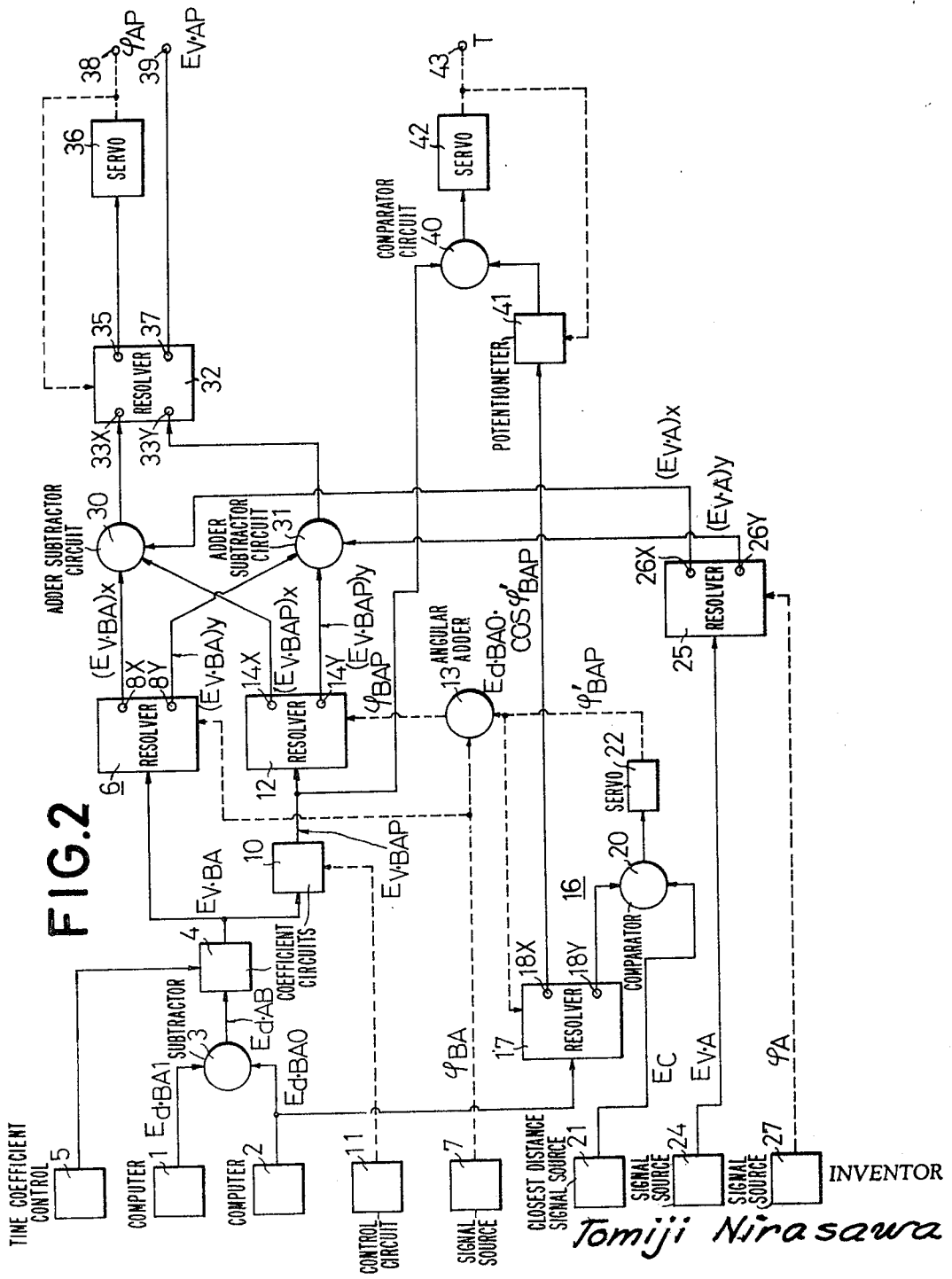
FIGS. 2–4 are block diagrams showing examples of the speed, heading and/or time signal generating system for marine use according to this invention.

FIG. 2 illustrates, one example of a system for obtaining the speed $E_{V.AP}$ given by the equation (10) and the head bearing $\phi_{AP}$ given by the equation (19) of the ship A and the time T given by the equation (21).

In FIG. 2 reference numerals 1 and 2 indicate signal sources from which are respectively derived the aforementioned voltage signals $E_{d.BA1}$ and $E_{d.BA0}$. These outputs are respectively applied to a subtractor circuit 3 to obtain an output $E_{d.BA}$ from $(E_{d.BA0} - E_{d.BA1})$ and this output is supplied to a coefficient circuit 4. The coefficient circuit 4 is controlled by a time coefficient setting control circuit 5 and produces an output $$E_{V.BA} = \frac{E_{d.BA0} - E_{d.BA1}}{\Delta t}$$

given by equation (13) which has a coefficient corresponding to the time $\Delta t$. This output is fed to a conventional resolver 6 for obtaining X- and Y-axis components. The rotor of the resolver 6 is supplied with a mechanical rotational angular output from a signal source 7 proportional to $\phi_{BA}$ to derive X- and Y- components at output terminals 8X and 8Y equal to $(E_{V.BA})_x = E_{V\ BA}\cdot\cos\phi_{BA}$ (from equation (11)) and $E_{V.BA})_y = E_{V.BA}\cdot\sin\phi_{BA}$ (from equation (12)), respectively.

The output $E_{V.BA}$ from the coefficient circuit 4 is also applied to another coefficient circuit 10. The coefficient circuit 10 is controlled by a signal derived from an $\alpha$ coefficient setting control circuit 11 and produces an output $E_{V.BAP} = \alpha\cdot E_{V.BA}$ defined by equation (14). This is fed to a resolver 12 similar to resolver 6. The resolver 12 is supplied with a mechanical rotational angular output corresponding to $\phi_{BA}$ from a rotational angular adder device 13 and produces at X- and Y- components at output terminals 14X and 14Y. Those outputs are $(E_{V.BAP})_x = E_{V.BAP}\cdot\cos\phi_{BAP}$ (from equation (11)) and $(E_{V.BAP})_y = E_{V.BAP}\cdot\sin\phi_{BAP}$ (from equation (12)), respectively. In this case, $\phi_{BAP}$ is obtained in the form of $\phi_{BAP} = \phi_{BA} + \phi'_{BAP}$ as given by the equation (15) with the adder device 13 based upon the mechanical rotational angular outputs of $\phi_{BA}$ and $\phi'_{BAP}$ respectively derived from the signal source 7 and a circuit 16.

The circuit 16 for obtaining the output of $\phi'_{BAP}$ is of the following construction. That is, the circuit 16 consists of a resolver 17 similar to resolvers 6 and 12, which is supplied with the output $E_{d.BA0}$ from the signal source 2. An output of the resolver 17 derived at its Y-axis component output terminal 18Y is supplied to a comparator circuit 20, which is, in turn, supplied with the output $E_C$ in the equation (18) from a closest distance setting signal source 21. The output supplied from the output terminal 18Y of the resolver 17 is compared with the output $E_C$ to obtain a compared output. The resulting compared output is fed to a servo circuit 22 provided with a servo-motor and a mechanical rotational angular output produced by the servo-motor of the servo circuit 22 is supplied to the rotor of the resolver 17. Thus, a servo loop is formed and the output of the comparator circuit 20 will be driven to zero. The output derived at the Y-axis component output terminal 18Y of the resolver 17 is compared with the output $E_C$ and the servo loop is provided, so that the output at the Y-axis component output terminal 18Y is $E_{d.BA0}\cdot\sin\phi'_{BAP}$ and the output of the servo circuit 22 is obtained as $\phi'_{BAP}$ expressed by $$\sin^{-1}\frac{E_C}{E_{d\cdot BAO}}$$

in the equation (18). With the circuit 16 described above, the output $\phi'_{BAP}$ can be obtained in ranges of more and less than $\pm 90°$ about $\phi_{BA}$ but $\phi'_{BAP}$ is produced only within a range of less than $\pm 90°$ about $\phi_{BA}$ with the value of $E_C$ so that $\phi'_{BAP}$ cannot be obtained in the range of more than $\pm 90°$ about $\phi_{BA}$ from a practical point of view.

In the figure reference numeral 24 designates a signal source from which $E_{V.A}$ is derived. The signal $E_{V.A}$ is supplied to a resolver 25 identical to resolvers 6 and 12. The rotor of the resolver 25 is supplied with a rotational output $\phi_A$ from a signal source 27 and produces outputs $(E_{V.A})_x = E_{V.A}\cdot\cos\phi_A$ from equations (11)) and $(E_{V.A})_y = E_{V.A}\cdot\sin\phi_A$ (from equation (12)) at the X- and Y-axis component output terminals 26X and 26Y of the resolver 25, respectively.

The outputs $(E_{V.BA})_x$, $(E_{V.BAP})_x$ and $(E_{V.A})_x$ respectively obtained by the resolvers 6, 12 and 25 are applied to an adder-subtractor circuit 30, which produces an output $\{(E_{V.BA})_x - (E_{V.BAP})_x + (E_{V.A})_x\}$ as given by equation (10). The resulting output is supplied to an X-axis component input terminal 33X of a conventional resolver 32. Similarly, the outputs $(E_{V.BA})_y$, $(E_{V.BAP})_y$ and $(E_{V.A})_y$ from the resolvers 6, 12 and 25 are also applied to an adder-subtractor circuit 31, which produces an output $\{(E_{V.BA})_y - (E_{V.BAP})_y + (E_{V.A})_y\}$ as given by equation (10) and this output is supplied to a Y-axis component input terminal 33Y of the resolver 32. At an output terminal 35 of the resolver 32, is derived a signal equal to the difference between the X- and Y-axis component inputs fed to terminals 33Y and 33X, respectively. This signal is supplied to a servo circuit 36 provided with a servo-motor, the rotational angular output of which is applied to the rotor of the resolver 32, thus constituting a servo loop to maintain the output at the output terminal 35 zero. As a result, a rotational angular output corresponding to $\phi_{AP}$ based upon equation (19) is derived at an output 38 of the servo circuit 36. At an output terminal 39 connected to the output terminal 37 of the resolver 32 is derived an output of the sum of the X- and Y-axis component inputs fed to the input terminals 33X and 33Y, which is the square root of the sum of the squares of the inputs fed to the input terminals 33X and 33Y. This signal is $E_{V.AP}$ shown on the left side of equation (10) and depends on the factors on the right side of equation (10).

The output $E_{V.BAP}$ derived by the coefficient circuit 10 is supplied to a comparator circuit 40 which also receives through a potentiometer circuit 41 the output $E_{d.BA0}\cdot\cos\phi'_{BAP}$ derived at the X-axis component output terminal 18X of the resolver 17. The compared output from the comparator circuit 40 is applied to a servo circuit 42 having a servo-motor. A slide contact of the potentiometer circuit 41 is controlled by the rotational output of the servo-motor, thus constituting a servo loop to reduce the output of the comparator circuit 40 to zero. As a result an output having a rotational angle corresponding to the time $T$ as defined in equation (21) is obtained at an output terminal 43 connected to the servo circuit 42.

With the system of FIG. 2, when the ship A has a relationship to the neighboring ship B which would result in a collision between the times $t_1$ and $t_0$, the time setting control circuit 5 and the $\alpha$ setting control circuit 11 are positioned to set a time and $\alpha$ respectively. The output $E_C$ corresponding to the closest distance $C$ is established by setting circuit 21, thereby producing the outputs $E_{V.AP}$ and $\phi_{AP}$ corresponding to the speed $V_{AP}$ and the heading $\phi_A$ of the ship A to be adopted at the time $t_0$. These output are based upon the output $E_{d.BA1}$ corresponding to the distance $d_{BA1}$ between the ships A and B obtained at the time $t_1$, the output $E_{d.BA0}$ corresponding to the distance $d_{BA0}$ between them at the time $t_0$, the output corresponding to their relative heading $\phi_{BA}$ at the time $t_0$ or $t_1$, the output $E_{V.A}$ corresponding to the speed $V_A$ of the ship A at the time $t_0$ and the output corresponding to the heading $\phi_A$ of the ship A at the time $t_0$. The output corresponding to the time $T$ at which the predetermined distance $C$ of the closest point of approach between the ships A and B would occur after the time $t_0$ when the outputs $E_{V.AP}$ and $\phi_{AP}$ corresponding to the speed and new heading of the ship A have been obtained.

The system of FIG. 2 prevents collisions when the ships A and B have such a relationship to each other as would lead to collision between the times $t_1$ and $t_0$. The collision is avoided by using $E_{V.AP}$ and $\phi_{AP}$ respectively given by the equations (10) and (19) as the speed and heading signals of the ship A which are to be adopted at the time $t_0$ and held thereafter. However, since the collision can be avoided by selecting the relative speed and heading of the two ships, the same result can be obtained by changing $E_{V.AP}$ obtained from the equation (10) to a speed signal (taken as $E_{V.APC}$) equal to $E_{V.A}$ at the time when $E_{V.AP}$ was provided and by changing $\phi_{AP}$ derived from the equation (19) to a heading signal (taken as $\phi_{APC}$) which is provided at the time when $E_{V.AP}$ is changed to $E_{V.APC}$.

$E_{V.APC}$ and $\phi_{APC}$ can be obtained in the following manner as shown by equation (9).

In the case of $E_{V.APC}$, the following equation can be obtained by replacing $E_{V.AP}$ and $\phi_{AP}$ in equation (9) with $E_{V.APC}$ and $\phi_{APC}$ respectively, $$E_{V.A} L \phi_{APC} = E_{V.BA} L \phi_{BA} - E_{V.BAP} L \phi_{BAP} + E_{V.A} L \phi_A \quad (9')$$

and all the components except $\phi_{APC}$ in the above equation (9') are known components so that $\phi_{APC}$ can be obtained from the equation (9'). However, the value of $E_{V.BAP}$ established by the equation (14) as above described must be selected within a limited range as is seen from the equation (9') and this range is narrower than $|E_{V.B} - E_{V.AP}|$.

With $E_{V.BAP}$ established within this range, if $E_{V.B} < E_{V.A}$, $\phi_{APC}$ has one value this can be used as the value changed from $\phi_{AP}$ which is the value when $E_{V.AP}$ is altered to $E_{V.APC} (= E_{V.A})$. If $E_{V.B} \geq E_{V.A}$, $\phi_{APC}$ has two values obtained from $|\phi_A \sim \phi'_{AP}|$ the smaller one in this case can be used as $\phi_{APC}$ altered from $\phi_{AP}$.

Figure 3:
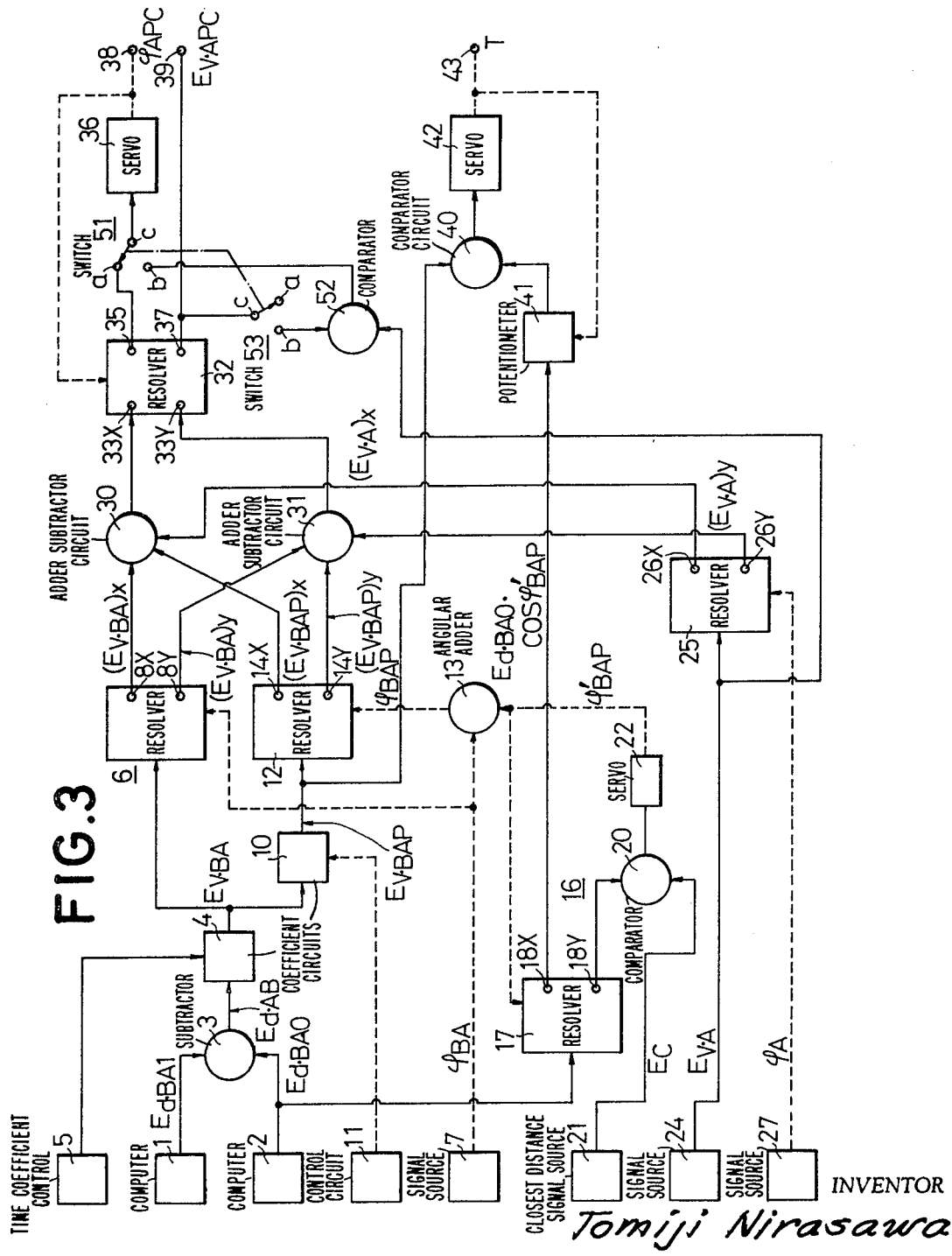

A circuit for obtaining $E_{V.APC}$ and $\phi_{APC}$ is shown in FIG. 3 which can be switched to produce $E_{V.AP}$ and $\phi_{AP}$, $E_{V.APC}$ and $\phi_{APC}$. Many of the elements of FIG. 3 are the same as those in FIG. 2 and the description of these will not be repeated. A changeover switch 51 is provided on the input side of the servo circuit 36 and one contact $a$ of the switch 51 is connected to the output terminal 35 of the resolver 32. The other contact $b$ of switch 51 is connected to the output of the comparator circuit 52. The comparator circuit 52 is supplied with the output $E_{V.A}$ from the signal source 24 and the output from the output terminal 37 of the resolver 32 through a switch 53 which is ganged with the switch 51 and closes when switch 51 engages the contact $b$. The comparator circuit 52 compares both inputs supplied thereto and its compared output is applied to the servo circuit 36. In the event that the switch 51 engages contact $a$ and switch 53 is open, $E_{V.AP}$ and $\phi_{AP}$ based upon the equations (10) and (19) can be respectively derived at the output terminals 38 and 39 as above described. While, in the case when the switch 51 engages contact $b$ and the switch 53 is closed, the output at the output terminal 37 of the resolver 32 is clamped by $E_{V.A}$, so that an output $E_{V.APC}$ changed from $E_{V.AP}$ and equal to $E_{V.A}$ is obtained at the output terminal 39 and an output $\phi_{APC}$ altered from $\phi_{AP}$ based upon the speed signal $E_{V.APC} (= _{V.A})$ at that time is obtained at the output terminal 38 in accordance with equation (9'). In this case, however, the value of $\alpha$ for obtaining the output $E_{V.BAP}$ is adjusted by the coefficient circuit 10 as previously described and the output of the servo circuit 36 when stabilized is obtained as $\phi_{APC}$ satisfying the condition of equation (9').

The time at which the distance of the closest point of approach would be obtained is obtained as a rotational angular output corresponding to $E_{V.APC}$ and $\phi_{APC}$ at the terminal 43 in the above case. This will be apparent from the fact that $\alpha$ in the coefficient circuit 10 is adjusted and its output is supplied to the comparator circuit 40 for the servo circuit 42.

Thus in this system collision is avoided by using $E_{V.APC}$ and $\phi_{APC}$ but the same result can be obtained by changing $E_{V.AP}$ to a speed signal $E'_{V.APC}$ representative of $K \cdot E_{V.A}$ and by changing $\phi_{AP}$ to $\phi'_{APC}$ which is produced at the time when $E_{V.AP}$ is changed to $E'_{V.APC}$.

In this case $E'_{V.APC}$ and $\phi'_{APC}$ can be obtained from the following equation by replacing $E_{V.VP}$ and $\phi_{AP}$ with $E'_{V.APC} (= K \cdot E_{V.AP})$ and $\phi'_{APC}$ in equation (9).

$$k \cdot E_{V.A} < \phi'_{APC} = E_{V.BA} < \phi_{BA}$$
$$- E_{V.BAP} < \phi_{BAP} + E_{V.A} < \phi_A \quad (9'')$$

where $k$ is a constant.

Figure 4:
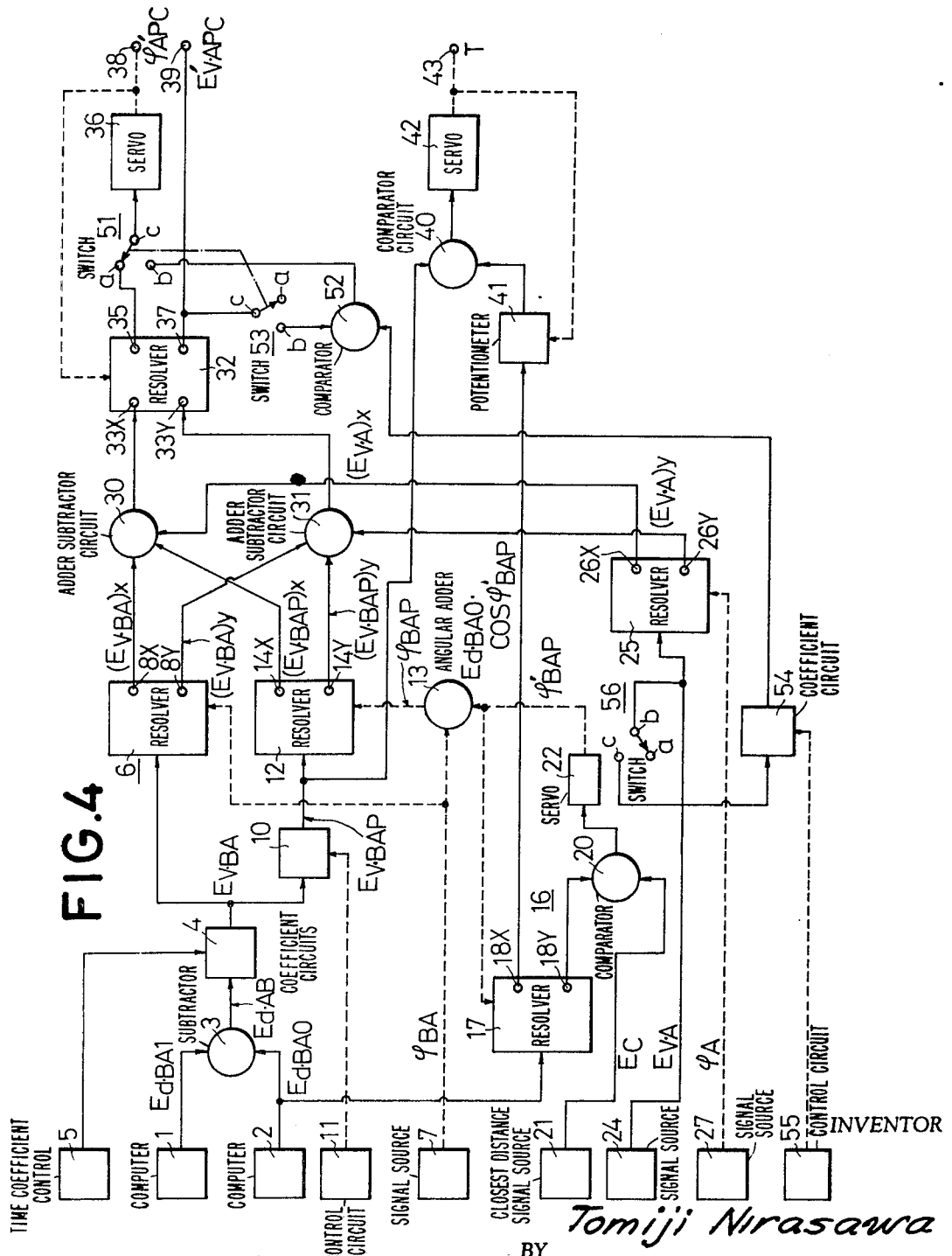

A circuit for obtaining $E'_{V.APC}$ and $\phi'_{APC}$ is shown in FIG. 4 which can be switched to produce $E_{V.AP}$ and $\phi_{AP}$, $E_{V.APC} (= E_{V.A})$ and $\phi_{APC}$, $E'_{V.APC} (= k \cdot E_{V.A})$ and $\phi'_{APC}$. Elements common to those shown in FIGS. 2 and 3 are not repeated. The output $E_{V.A}$ derived from the signal source 24 is supplied to the comparator circuit 52 through a switch 56. The output $E_{V.A}$ from the coefficient circuit 54, which is controlled by a coefficient setting control circuit 55 by $k$ to produce the output $k \cdot E_{V.A}$ and the resulting output is applied to the comparator circuit 52.

When the switch 51 engages contact $a$ and the switches 53 and 55 are both open, the outputs $E_{V.AP}$ and $\phi_{AP}$ are derived at the output terminals 38 and 39 as above described. When the switch 51 engages contact $b$ and both of the switches 53 and 56 are closed and the control circuit 55 is not energized, $E_{V.AP}$ and $\phi_{AP}$ are respectively derived at the output terminals 38 and 39. When the switch 51 engages the contact $b$, the switch 53 is closed and the switch 56 is open and the control circuit 55 is energized, $E'_{V.APC}$ and $\phi'_{APC}$ are respectively obtained based upon the equation (9''). In this case, however, the value of $\alpha$ for producing the output $E_{V.BAP}$ is adjusted as in the case of FIG. 3 and the output of the servo circuit 36 when stabilized is obtained as $\phi'_{APC}$ satisfying the condition of equation (9'').

With the arrangement of FIG. 4 described above, in the case where $E'_{V.APC}$ and $\phi'_{APC}$ have been respectively obtained, the time $T$ in which the distance of the closest point of approach would be obtained after the present time $t_0$ is produced as a time signal corresponding to $E'_{V.APC}$ and $\phi'_{APC}$ as previously described in connection with FIG. 3.

The foregoing description has been given of the case for obtaining signals for providing speed and heading of the ship A at the present time on the assumption that the ships A and B are in danger of collision as indicated by the distance vector on the line $\vec{\Delta d_{BA}}$ in FIG. 1. In practice, however, it is desirable to obtain such signals also in the case where the ships would not collide with each other but would come close together. The speed signal and heading signal in this case are obtained by shifting the relative distance vector (corresponding to $\vec{\Delta d_{BA}}$ above mentioned) onto the line $L_B$ of $\vec{\Delta d_{BA}}$ and assuming it as $\vec{\Delta d_{BA}}$ above mentioned. It will be seen that, in this case, the values of the resulting speed and heading signals are calibrated in accordance with the distance which the ships would enter into the predetermined zone relative to each other. In such a case, if the polarities of the speed and heading signals are selected that when the ships are in such a relationship to each other such that they would pass each other on the port (or starboard), they would be maintained in such a relationship and the distance of the closest point of approach would become greater than at least a selected predetermined value and no collision problem would exist.

Although the present invention has been described in connection with the case of two ships, it will be understood that the invention is applicable to the case of a ship and a fixed object or any other collision situation.

It will be apparent that many modifications and variations may be effected without departing from the scope of the novel concepts of this invention.

I claim:

1. An anticollision system for preventing a collision between a craft and an obstacle comprising:
   means for producing a signal proportional to the relative velocity between said craft and said obstacle at an initial time;
   means for calculating a relative velocity signal between said craft and obstacle at a time later than said initial time which would avoid collision;
   means for producing a shaft output proportional to relative bearing between said craft and obstacle at said initial time;
   means for producing a shaft output proportional to the relative bearing between said craft and said obstacle at a time after said initial time;
   first resolving means receiving inputs from said means producing said relative velocity at an initial time and said means producing a signal proportional to the relative bearing at said initial time and producing X and Y components;
   second resolving means receiving the output of said means for producing a signal proportional to relative bearing at a time after said initial time and also receiving the output of said means for producing a signal proportional to relative velocity at a time later than said initial time and producing X and Y components;
   a third resolving means producing X and Y component outputs proportional to the velocity of the craft in the X and Y directions;
   a first adder subtractor circuit receiving the X components from said first, second and third resolving means;
   a second adder subtractor circuit receiving the Y components from said first, second and third resolving means; and
   a fourth resolver producing a pair of outputs and receiving the outputs of said first and second adder subtractor circuits and one of said outputs proportional to the velocity of the craft at the time after said initial time.

2. In an anticollision system according to claim 1, a servo receiving said second output of said fourth resolver and supplying a shaft input to said fourth resolver to drive said second output to zero and the shaft position of said servo indicative of the heading of said craft at a time after said initial time.

3. In an anticollision system according to claim 2, a comparator circuit receiving an input from said means calculating a relative velocity at a time later than said initial time,
   a potentiometer supplying an input to said comparator circuit,
   a second servo receiving the output of said comparator circuit and supplying a shaft input to said potentiometer to drive the output of said comparator circuit to zero and said shaft position of said second servo indicative of the time from the initial time to the time when the craft and obstacle are at the nearest point of approach.

4. In an anticollision system according to claim 3,
   means for generating a signal proportional to the closest distance between said craft and obstacle,
   a fifth resolver producing X and Y components and receiving an input indicative of the distance between said craft and obstacle at said initial time and said potentiometer receiving said X component,
   a second comparator circuit receiving inputs from said means generating said signal proportional to closest distance and the Y component from said fifth resolver,
   a third servo receiving the output of said second comparator circuit and furnishing a shaft input to said fifth resolver,
   said means producing a shaft output proportional to relative bearing between said craft and obstacle at a later time receiving inputs from said means producing relative bearing at said initial time and said third servo and supplying a shaft input to said second resolver.

5. An anticollision system according to claim 4, comprising means producing a signal proportional to the velocity of the craft at said initial time supplying an input to said third resolver and means supplying a shaft input to said third resolver indicative of the heading of said craft at said initial time.

6. An anticollision system according to claim 5, including,
   a third comparator circuit receiving an input from said means producing a signal proportional to velocity at said initial time,
   first switch means for connecting said first servo to the output of said third comparator circuit and disconnecting said first servo from said second output of said fourth resolver,
   second switch means for connecting said first output from said fourth resolver to said third comparator circuit.

7. An anticollision system according to claim 6, including a coefficient circuit connected between said means producing a signal proportional to said velocity of the craft at said initial time and said third comparator circuit, and means for controlling the gain of said coefficient circuit.

8. A signal generating system for a ship for preventing collisions between the ship and another object, comprising:

first coefficient signal setting and delivering means for setting a time coefficient corresponding to a predetermined time and delivering a coefficient signal $\Delta t$ corresponding to the time coefficient;

second coefficient signal setting and delivering means for setting a coefficient represented by zero or a positive number and delivering a coefficient signal $\alpha$ corresponding to the coefficient;

a closest distance signal setting and delivering source for setting the distance of the closest point of approach between the ship and the other object and delivering a closest distance signal $E_C$ corresponding to the closest distance;

a first relative distance signal source for producing a relative distance signal $E_{d.BA0}$ corresponding to the distance between the ship first coefficient signal setting and delivering means for setting a time coefficient corresponding to a predetermined time and delivering a coefficient signal $\Delta t$ corresponding to the time coefficient; and the other object at the present time;

a second relative distance signal source for producing a relative distance signal $E_{d.BA1}$ corresponding to the distance between the ship and the other object at a past time earlier than the present time by a predetermined time;

a heading signal source for producing a heading signal $\phi_A$ corresponding to the heading of the ship between the present time and the past time;

a relative bearing signal source for producing a relative bearing signal $\phi_{BA}$ corresponding to the relative bearing of the other object to the ship between the present time and the past time;

a speed signal source for producing a speed signal $E_{V.A}$ corresponding to the speed of the ship between the present time and the past time; and speed signal generating means for generating a speed signal $E_{V.AP}$ at the present time and thereafter for controlling the speed of the ship for avoiding collision with the other object based upon the coefficient signals $\Delta t$ and $\alpha$, the closest distance signal $E_C$, the relative distance signals $E_{d.BA0}$ and $E_{d.BA1}$, the heading and bearing signals $\phi_A$ and $\phi_{BA}$ and the speed signal $E_{V.A}$, the speed signal $E_{V.AP}$ being expressed by the following equation:

$$E_{V.AP} = \sqrt{\{(E_{V.BA})_x - (E_{V.BAP})_x + (E_{V.A})_x\}^2 + \{(E_{V.BA})_y - (E_{V.BAP})_y + (E_{V.A})_y\}^2}$$

where $(E_{V.BA})_x = E_{V.BA} \cdot \cos\phi_{BA}$ $(E_{V.BAP})_x = E_{V.BAP} \cdot \cos\phi_{BAP}$ $(E_{V.A})_x = E_{V.A} \cdot \cos\phi_A$ $(E_{V.BA})_y = E_{V.BA} \cdot \sin\phi_{BA}$ $(E_{V.BAP})_y = E_{V.BAP} \cdot \sin\phi_{BAP}$ $(E_{V.A})_y = E_{V.A} \cdot \sin\phi_A$ $$E_{V.BA} = \frac{E_{d.BA0} - E_{d.BA1}}{\Delta t}$$

$$E_{V.BAP} = \alpha E_{V.BA}$$

and $$\phi_{BAP} = \phi_{BA} + \sin^{-1}\frac{E_C}{E_{d.BA0}}.$$

9. A signal generating system for a ship for preventing collisions between the ship and another object, comprising:

first coefficient signal setting and delivering means for setting a time coefficient corresponding to a predetermined time and delivering a coefficient signal $\Delta t$ corresponding to the time coefficient;

second coefficient signal setting and delivering means for setting a coefficient represented by zero or a positive number and delivering a coefficient signal $\alpha$ corresponding to the coefficient;

a closest distance signal setting and delivering source for setting the distance of the closest point of approach between the ship and the other object and delivering a closest distance signal $E_C$ corresponding to the closest distance;

a first relative distance signal source for producing a relative distance signal $E_{d.BA0}$ corresponding to the distance between the ship and the other object at the present time;

a second relative distance signal source for producing a relative distance signal $E_{d.BA1}$ corresponding to the distance between the ship and the other object at a past time earlier than the present time by a predetermined time;

a heading signal source for producing a heading signal $\phi_A$ corresponding to the heading of the ship between the present time and the past time;

a relative bearing signal source for producing a relative bearing signal $\phi_{BA}$ corresponding to the relative bearing of the other object to the ship between the present time and the past time;

a speed signal source for producing a speed signal $E_{V.A}$ corresponding to the speed of the ship between the present time and the past time; and heading signal generating means for generating a heading signal $\phi_{AP}$ at the present time and thereafter for controlling the heading of the ship for avoiding collision with the other object based upon the coefficient signals $\Delta t$ and $\alpha$, the closest distance signal $E_C$, the relative distance signals $E_{d.BA0}$ and $E_{d.BA1}$, the bearing signals $\phi_A$ and $\phi_{BA}$ and the speed signal $E_{V.A}$, the heading signal $\phi_{AP}$ being expressed by the following equation:

$$\phi_{AP} = \tan^{-1}\frac{(E_{V.BA})_y - (E_{V.BAP})_y + (E_{V.A})_y}{(E_{V.BA})_x - (E_{V.BAP})_x + (E_{VV.A})_x}$$

where $(E_{V.BA})_x = E_{V.BA} \cdot \cos\phi_{BA}$ $(E_{V.BAP})_x = E_{V.BAP} \cdot \cos\phi_{BAP}$ $(E_{V.A})_x = E_{V.A} \cdot \cos\phi_A$ $(E_{V.BA})_y = E_{V.BA} \cdot \sin\phi_{BA}$ $(E_{V.BAP})_y = E_{V.BAP} \cdot \sin\phi_{BAP}$ $(E_{V.A})_y = E_{V.A} \cdot \sin\phi_A$ $$E_{V \cdot BA} = \frac{E_{d \cdot BA0} - E_{d \cdot BA1}}{\Delta t}$$

$$E_{V \cdot BAP} = \alpha \cdot E_{V \cdot BA}$$

and $$\phi_{BAP} = \phi_{BA} + \sin^{-1} \frac{E_C}{E_{d \cdot BA0}}.$$

10. A signal generating system for a ship for preventing collisions between the ship and another object, comprising:
  first coefficient signal setting and delivering means for setting a time coefficient corresponding to a predetermined time and delivering a coefficient signal $\Delta t$ corresponding to the time coefficient;
  second coefficient signal setting and delivering means for setting a coefficient represented by zero or a positive number and delivering a coefficient signal $\alpha$ corresponding to the coefficient;
  a closest distance signal setting and delivering source for setting the distance of the closest point of approach between the ship and the other object and delivering a closest distance signal $E_C$ corresponding to the closest distance;
  a first relative distance signal source for producing a relative distance signal $E_{d.BA0}$ corresponding to the distance between the ship and the other object at the present time;
  a second relative distance signal source for producing a relative distance signal $E_{d.BA1}$ corresponding to the distance between the ship and the other object at a past time earlier than the present time by a predetermined time;
  time signal generating means C generating a time signal T representative of a time from the present time until the time of obtaining the distance of the closest point of approach between the ship and the other object without a collision therebetween based upon the coefficient signals $\Delta t$ and $\alpha$, the closest distance signal $E_c$, and the relative distance signals $E_{d.BA0}$ and $E_{d.BA1}$, the time signal T being expressed by the following equation:

$$T = \frac{E_{d \cdot BA0} \cdot \cos \phi'_{BAP}}{E_{V \cdot BAP}}$$

where $$\phi'_{BAB} = \sin^{-1} \frac{E_C}{E_{d \cdot BA0}}$$

$$E_{V \cdot BAP} = \alpha \cdot E_{V \cdot BA}$$

$$E_{V \cdot BA} = \frac{E_{d \cdot BA0} - E_{d \cdot BA1}}{\Delta t}.$$

11. A system as claimed in claim 8 which further includes heading signal generating means for generating a heading signal $\phi_{AP}$ at the present time and thereafter for controlling the heading of the ship for avoiding collision with the other object based upon the coefficient signals $\Delta t$ and $\alpha$, the closest distance signal $E_C$, the relative distance signals $E_{d.BA0}$ and $E_{d.BA1}$, the heading and bearing signals $\phi_A$ and $\phi_{BA}$ and the speed signal $E_{V.A}$, the heading signal $\phi_{AP}$ being expressed by the following equation:

$$\phi_{AP} = \tan^{-1} \frac{(E_{V \cdot BA})_y - (E_{V \cdot BAP})_y + (E_{V \cdot A})_y}{(E_{V \cdot BA})_x - (E_{V \cdot BAP})_x + (E_{V \cdot A})_x}.$$

12. A system as claimed in claim 8 which further includes time signal generating means for generating a time signal T representative of a time from the present time until the time of obtaining the distance of the closest point of approach between the ship and the other object without a collision therebetween based upon the coefficient signals $\Delta t$ and $\alpha$, the closest distance signal $E_C$, and the relative distance signals $E_{d.BA0}$ and $E_{d.BA1}$, the time signal T being expressed by the following equation:

$$T = \frac{E_{d \cdot BA0} \cdot \cos \phi'_{BAP}}{E_{V \cdot BAP}}$$

where $$\phi'_{BAB} = \sin^{-1} \frac{E_C}{E_{d \cdot BA0}}.$$

13. A system as claimed in claim 9 which further includes time signal generating means for generating a time signal T representative of a time from the present time until the time of obtaining the distance of the closest point of approach between the ship and the other object without a collision therebetween based upon the coefficient signals $\Delta t$ and $\alpha$, the closest distance signal $E_C$, and the relative distance signals $E_{d.BA0}$ and $E_{d.BA1}$, the time signal T being expressed by the following equation:

$$T = \frac{E_{d \cdot BA0} \cdot \cos \phi'_{BAP}}{E_{V \cdot BAP}}$$

where $$\phi'_{BAB} = \sin^{-1} \frac{E_C}{E_{d \cdot BA0}}.$$

14. A system as claimed in claim 8 which further includes heading signal generating means for generating a heading signal $\phi_{AP}$ at the present time and thereafter for controlling the heading of the ship for avoiding collision with the other object based upon the coefficient signals $\Delta t$ and $\alpha$, the closest distance signal $E_C$, the relative distance signals $E_{d.BA0}$ and $E_{d.BA1}$, the heading and bearing signals $\phi_A$ and $\phi_{BA}$ and the speed signal $E_{V.A}$, the heading signal $\phi_{AP}$ being expressed by the following equation:

$$\phi_{AP} = \tan^{-1} \frac{(E_{V \cdot BA})_y - (E_{V \cdot BAP})_y + (E_{V \cdot A})_y}{(E_{V \cdot BA})_x - (E_{V \cdot BAP})_x + (E_{V \cdot A})_x}$$

and time signal generating means for generating a time signal T representative of a time from the present time until the time of obtaining the distance of the closest point of approach between the ship and the other object without a collision therebetween based upon the coefficient signals $\Delta t$ and $\alpha$, the closest distance signal $E_C$, and the relative distance signals $E_{d.BA0}$ and $E_{d.BA1}$, the time signal T being expressed by the following equation:

$$T = \frac{E_{d \cdot BA0} \cdot \cos \phi'_{BAP}}{E_{V \cdot BAP}}$$

where $$\phi'_{BAB} = \sin^{-1} \frac{E_C}{E_{d \cdot BA0}}.$$

15. A system as claimed in claim 8, which includes heading signal generating means for generating a heading signal $\phi_{APC}$ at the present time and thereafter for controlling the heading of the ship for avoiding collision with other object by changing the speed signal $E_{V.AP}$ to that $E_{V.A}$ based upon the speed signals $E_{V.A}$, $E_{V.BA}$ and $E_{V.BAP}$ and the heading and bearing signals $\phi_{BA}$, $\phi_{BAP}$ and $\phi_A$, the heading signal $\phi_{APC}$ being expressed by the following equation:

$$E_{V.A} < \phi_{APC} = E_{V.BA} < \phi_{BA} - E_{V.BAP} < \phi_{BAP} + E_{V.A} < \phi_A .$$

16. A system as claimed in claim 8 which includes heading signal generating means for generating a heading signal $\phi'_{APC}$ at the present time and thereafter for controlling the heading of the ship for avoiding collision with another object by changing the speed signal $E_{V.AP}$ to that $k \cdot E_{V.A}$ ($k$ being a constant) based upon the speed signals $E_{V.A}$, $E_{V.BA}$ and $E_{V.BAP}$ and the heading and bearing signals $\phi_{BA}$, $\phi_{BAP}$ and $\phi_A$, the heading signal $\phi'_{APC}$ being expressed by the following equation:

$$k \cdot E_{V.A} < \phi'_{APC} = E_{V.BA} < \phi_{BA} - E_{V.BAP} < \phi_{BAP} + E_{V.A} < \phi_A .$$

* * * * *